United States Patent
Sehrawat et al.

(10) Patent No.: US 11,496,287 B2
(45) Date of Patent: Nov. 8, 2022

(54) PRIVACY PRESERVING FULLY HOMOMORPHIC ENCRYPTION WITH CIRCUIT VERIFICATION

(71) Applicant: Seagate Technology LLC, Fremont, CA (US)

(72) Inventors: Vipin Singh Sehrawat, Singapore (SG); Hamza Jeljeli, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 331 days.

(21) Appl. No.: 16/996,270

(22) Filed: Aug. 18, 2020

(65) Prior Publication Data
US 2022/0060314 A1 Feb. 24, 2022

(51) Int. Cl.
*H04L 29/06* (2006.01)
*H04L 9/00* (2022.01)
*G06F 21/62* (2013.01)

(52) U.S. Cl.
CPC .............. *H04L 9/008* (2013.01); *G06F 21/62* (2013.01)

(58) Field of Classification Search
CPC ....... H04L 9/008; H04L 9/0833; G06F 21/62; G06F 21/602
See application file for complete search history.

(56) References Cited

U.S. PATENT DOCUMENTS

| 8,498,941 | B2 | 7/2013 | Felsher |
| 8,520,844 | B2 | 8/2013 | MacKenzie |
| 8,555,400 | B2 | 10/2013 | Shi et al. |
| 8,862,879 | B2 | 10/2014 | Lerner |
| 9,503,263 | B2 | 11/2016 | Johnston |
| 10,043,035 | B2 | 8/2018 | LaFever et al. |
| 10,069,631 | B2 | 9/2018 | Rane et al. |

(Continued)

FOREIGN PATENT DOCUMENTS

| CN | 104219056 A | * 12/2014 |
| CN | 105827402 A | 8/2016 |

(Continued)

OTHER PUBLICATIONS

Gentry et al., Homomorphic Encryption from Learning with Errors: Conceptualiy-Simpler, Asymptoticaliy-Faster, Attribute-Based, In: CRYPTO 2013: Advances in Cryptology, 33rd Annual Cryptology Conference, Santa Barbara, CA, USA, Aug. 18-22, 2013, pp. 75-92, 2013.

(Continued)

*Primary Examiner* — John B King
(74) *Attorney, Agent, or Firm* — Kagan Binder, PLLC

(57) ABSTRACT

A method of improving data security or privacy in a computing environment includes providing a group identifier value to at least a first user of one or more users and associating a first pseudonym with the first user. The method further includes encrypting a first data set according to a private key and marking the encrypted first data set according to the group identifier and the first pseudonym. The method also includes performing a first operation on the encrypted first data set and transforming the encrypted first data set into an encrypted second data set according to the first operation performed and the first pseudonym, decrypting the encrypted second data set using the private key, and analyzing the decrypted second data set.

19 Claims, 6 Drawing Sheets

(56) References Cited

U.S. PATENT DOCUMENTS

| | | | |
|---|---|---|---|
| 10,333,696 | B2 | 6/2019 | Ahmed |
| 10,454,668 | B2 | 10/2019 | Pasol et al. |
| 10,546,141 | B2 | 1/2020 | Miguel et al. |
| 2002/0103999 | A1* | 8/2002 | Camnisch ............ H04L 9/3218 713/155 |
| 2005/0220306 | A1 | 10/2005 | Westhoff et al. |
| 2012/0144185 | A1* | 6/2012 | Raykova ................ H04L 9/008 713/150 |
| 2014/0098960 | A1 | 4/2014 | Xu et al. |
| 2015/0154422 | A1 | 6/2015 | Ben Hamouda et al. |
| 2015/0236849 | A1* | 8/2015 | Ayday .................... G16B 50/00 713/193 |
| 2016/0224735 | A1 | 8/2016 | Ayday et al. |
| 2017/0099133 | A1* | 4/2017 | Gu ........................ H04W 4/023 |
| 2017/0155515 | A1* | 6/2017 | Androulaki ......... H04L 63/0823 |
| 2018/0139190 | A1* | 5/2018 | Chaum ................ G06F 21/602 |
| 2018/0307859 | A1 | 10/2018 | LaFever et al. |
| 2018/0359229 | A1 | 12/2018 | Ding et al. |
| 2019/0013950 | A1 | 1/2019 | Becker et al. |
| 2019/0089547 | A1* | 3/2019 | Simplicio, Jr. ....... H04L 63/108 |
| 2019/0182027 | A1 | 6/2019 | Kipnis et al. |
| 2019/0244138 | A1 | 8/2019 | Bhowmick et al. |
| 2019/0266343 | A1 | 8/2019 | Parida et al. |
| 2019/0363878 | A1 | 11/2019 | Sato et al. |
| 2021/0019754 | A1* | 1/2021 | Muthukrishnan ..... G06F 21/554 |
| 2021/0359846 | A1 | 11/2021 | Wright et al. |
| 2022/0070009 | A1* | 3/2022 | De Hoogh .............. H04L 9/085 |

FOREIGN PATENT DOCUMENTS

| | | | | |
|---|---|---|---|---|
| CN | 107682145 | A | | 2/2018 |
| CN | 107682159 | A | | 2/2018 |
| CN | 108449317 | A | | 8/2018 |
| CN | 108769023 | A * | 11/2018 | ......... H04L 63/0421 |
| CN | 109039578 | A * | 12/2018 | ......... H04L 63/0407 |
| CN | 109167778 | A | | 1/2019 |
| CN | 110113155 | A | | 8/2019 |
| CN | 110113203 | A | | 8/2019 |
| CN | 111385306 | A * | 7/2020 | ......... H04L 63/0421 |
| KR | 101912443 | B1 | | 10/2018 |
| KR | 101936033 | B1 | | 1/2019 |

OTHER PUBLICATIONS

Regev, Oded, On lattices, learning with errors, random linear codes, and cryptography, STOC 2005: Proceedings for the thirty-seventh annual ACM symposium on Theory of computing, pp. 84-93, May 2005.

Gentry, Fully Homomorphic Encryption Using Ideal Lattices, In: STOC 2009: Proceedings of the forty-first annual ACM Symposium on Theory of computing, pp. 169-178, May 2009.

Grolmusz, Vince, Superpolynomial Size Set-systems with Restricted Intersections mod 6 and Explicit Ramsey Graphs, In: Combinatorica, vol. 20, 15 pages, Nov. 8, 1999.

M. Dahl et al., "Private Data Aggregation on a Budget", Cryptology ePrint Archive Report 2017/643, 2017, eprint.iacr.org, 36 pages, Mar. 15, 2017.

* cited by examiner

PRIVACY PRESERVING FULLY HOMOMORPHIC ENCRYPTION WITH CIRCUIT VERIFICATION

BACKGROUND

The present invention is directed to homomorphic encryption, and more specifically to improvements to computer data privacy and security in fully homomorphic encryption.

Data aggregation is highly desirable in many computer systems and schemes. However, data aggregation currently poses the challenge of how to protect the privacy of the participants, parties, or users, especially when the participants do not trust each other and other computer-based entities such as a data aggregator or decryptor. Typically, the aggregator is a separate entity to the decryptor.

Homomorphic encryption is a cryptographic concept or mechanism that allows certain computations on encrypted data, generating an encrypted result which, when decrypted, matches the result of the same operations performed on the plaintext data. Computer-based verification of the operations performed via evaluation of homomorphic encryption schemes is a desirable capability particularly in settings where multiple distrusting users, parties, or entities are involved. Existing fully or partially homomorphic computer-based encryption schemes have limited privacy. Therefore, current homomorphic encryption schemes have weak security and privacy guarantees because of a lack of reliable, computer-based verification measures. This has necessitated a certain level of trust among the distrusting parties, which may not be desirable or practical, especially in settings where competitors are collaborating and sharing their encrypted data for homomorphic encryption evaluations.

SUMMARY

Aspects of the invention described herein are directed to improvements to homomorphic encryption as performed using one or more computers or computing systems or networks, including by providing for privacy-enhancing circuit verification, such as configuring computer systems to verify whether the parties performed the computations that they were supposed to. Disclosed embodiments also provide computer-based privacy preserving features, e.g., using and assigning pseudonyms, such as pseudorandom pseudonyms, to users in a fully homomorphic encryption scheme.

Existing fully or partially homomorphic encryption schemes have limited privacy and do not support using computers to verify the number of evaluation iterations previously performed on an arithmetic circuit. Disclosed are embodiments that enable a party, when authorized, to deduce a number of circuit evaluations without incurring considerable computer processing and overhead in the process. Disclosed embodiments allow for a computer system to be adapted to work on top of an existing, trusted, and established fully homomorphic encryption schemes.

According to a first aspect, a method of improving data security or privacy in a computing environment is disclosed. According to the first aspect, the method includes providing a group identifier value to at least a first user of one or more users. The method also includes associating a first pseudonym with the first user. The method further includes encrypting a first data set according to a private key and marking the encrypted first data set according to the group identifier and the first pseudonym. The method also includes performing a first operation on the encrypted first data set and transforming the encrypted first data set into an encrypted second data set according to the first operation performed and the first pseudonym. The method also includes decrypting the encrypted second data set using the private key and analyzing the decrypted second data set.

According to a second aspect, a system is disclosed. According to the second aspect, the system includes a hardware processor operatively coupled to a memory. Also according to the second aspect, the hardware processor is configured to execute instructions stored on the memory, including instructions for a process for improving data security or privacy in a computing environment. The process includes providing a group identifier value to at least a first user of one or more users. The process also includes associating a first pseudonym with the first user. The process also includes encrypting a first data set according to a private key. The process also includes marking the encrypted first data set according to the group identifier and the first pseudonym. The process also includes performing a first operation on the encrypted first data set. The process also includes transforming the encrypted first data set into an encrypted second data set according to the first operation performed and the first pseudonym. The process also includes decrypting the encrypted second data set using the private key. Finally, the process also includes analyzing the decrypted second data set.

According to a third aspect, a computer program product for improving data security or privacy is disclosed. According to the third aspect, the computer program product includes a computer-readable storage medium having program code embodied therewith, the program code comprising computer-readable program code configured to cause a processor to perform steps. The steps include providing a group identifier value to at least a first user of one or more users. The steps also include associating a first pseudonym with the first user. The steps further include encrypting a first data set according to a private key and marking the encrypted first data set according to the group identifier and the first pseudonym. The steps also include performing a first operation on the encrypted first data set and transforming the encrypted first data set into an encrypted second data set according to the first operation performed and the first pseudonym. The steps also include decrypting the encrypted second data set using the private key and analyzing the decrypted second data set.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
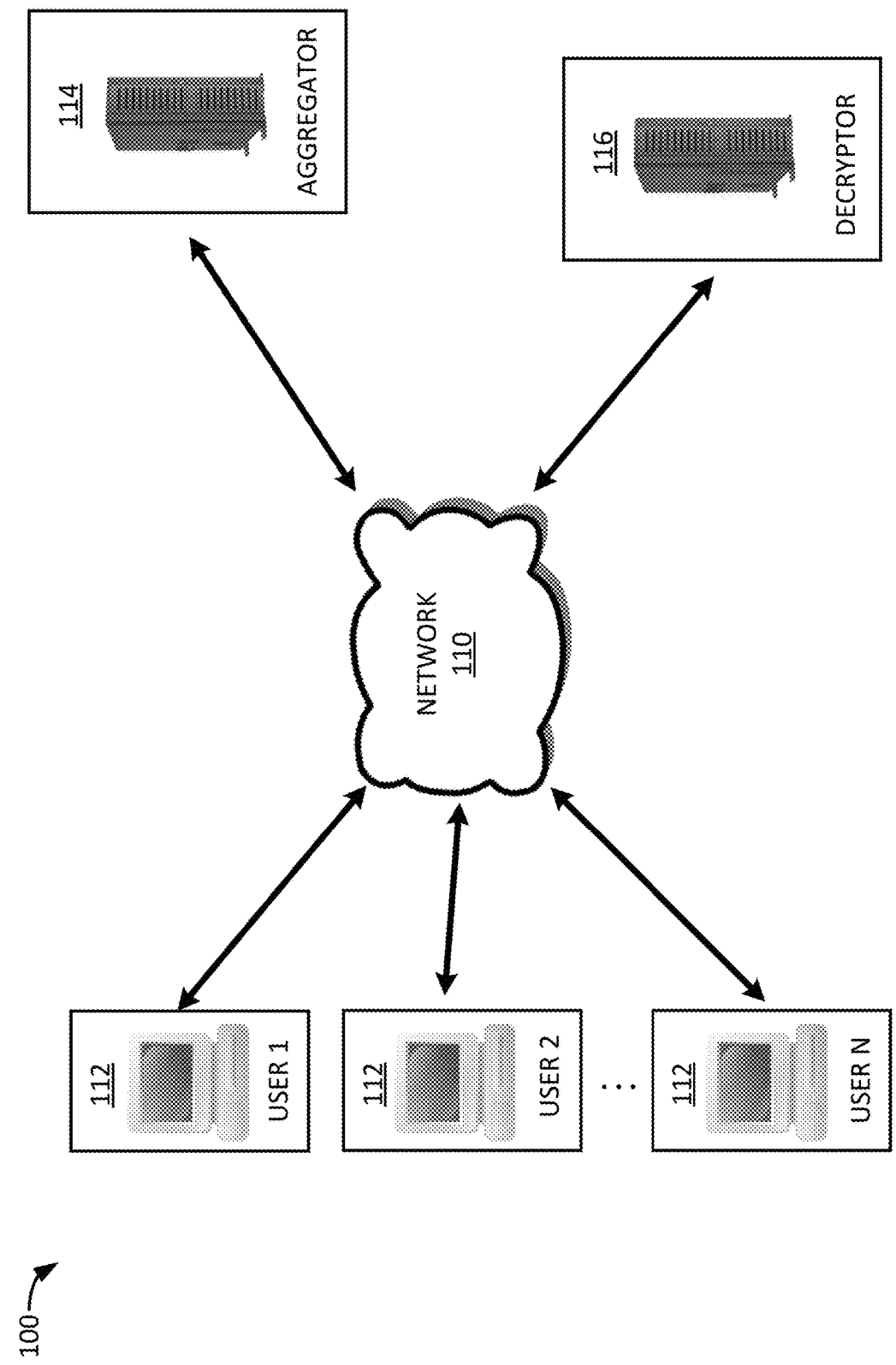
FIG. 1 is a computing environment for use with privacy-preserving homomorphic encryption, according to various embodiments.

The present invention is directed to new, computer-implemented homomorphic encryption (HE) schemes, and more specifically to improvements to computer-based data privacy and security in fully homomorphic encryption (FHE). HE is useful in many contexts and has many uses. Embodiments of the present disclosure can be particularly useful in contexts with one or more computing entities, which can represent various organizations, entities of a consortium or more than one consortium, entities within a corporation, entities of different corporations, and the like.

The present application makes improvements on the disclosures of following references:

"Homomorphic Encryption from Learning with Errors: Conceptually-Simpler, Asymptotically-Faster, Attribute-Based"—Craig Gentry, Amit Sahai, and Brent Waters. In: CRYPTO 2013, pp. 75-92. This reference is referred to hereinafter as "Gentry-1."

"Superpolynomial Size Set-systems with Restricted Intersections mod 6 and Explicit Ramsey Graphs"—Vince Grolmusz. In: Combinatorica 2000, volume 20, pp. 71-86. This reference is referred to hereinafter as "Grolmusz."

"On lattices, learning with errors, random linear codes, and cryptography"—Oded Regev. In: STOC 2005, pp. 84-93. This reference is referred to hereinafter as "Regev."

"Fully homomorphic encryption using ideal lattices"—Craig Gentry. In: STOC 2009, pp. 169-178. This reference is referred to hereinafter as "Gentry-2."

A computer, computer systems, networks, and the like within a computing environment can be individually or collectively configured to compile and aggregate data from multiple users that can be used to prepare a combined result, which can then be used to study a pattern, make a prediction, or improve an existing service. An example computer 600 is discussed with reference to FIG. 6, and an example computing environment 100 in which various embodiments herein can be carried out electronically is discussed with reference to FIG. 1.

Data aggregation allows one or more computer systems to compile data coming from multiple organizations or users in order to prepare a combined result. The compiled result can be used to study a pattern, to make a prediction, improve an existing service, among many other beneficial uses.

With a foundation of the references above, HE is a cryptographic mechanism that allows one or more computer to assist in performing computations over encrypted data. As an overview of the privacy-preservation and circuit verification mechanisms of the FHE schemes of the present disclosure, aspects of the of the FHE scheme of Gentry-1 can be used as a basis upon which computer-based embodiments of the present disclosure improve the operation of one or more computers and and make significant improvements and breakthroughs in both computer and encryption technology.

The present disclosure makes significant improvements to the existing HE schemes and methods. According to the present disclosure, improved HE can be used to allow an aggregator to compute the compiled result without learning the plaintext data of the users. During the process, users preferably use a computing device to encrypt their inputs (i.e., data or data sets) under a common (e.g., public key) and send the resulting ciphertexts to the aggregator, that homomorphically evaluates the aggregation function to obtain a ciphertext of the aggregated data. The decryptor can then use a computer to determine if the aggregator has operated honestly and authenticate the ciphertext of the aggregated data.

According to a process as carried out at least in party by a computer, and as a first step, a computer assigns each party (e.g., user, participant, organization, etc.) a (unique) pseudorandom pseudonym. The computer can generate the pseudorandom pseudonym using the set-systems from Grolmusz as carried out by one or more computers. Next, the computing provides all parties with an identical (e.g., secret) value. This random value serves as their group identifier or ID. The computer or other entity then uses the group identifier to identify the authorized parties that can participate in the protocol or operation. Third, while performing HE evaluations, the parties use their respective pseudonyms in conjunction with the shared common secret value to electronically "mark" each evaluation. Next, the party with access to the private key (e.g., the decryptor) can decrypt the final result of the HE evaluations, after which it can use the same private key to reveal the number of "marks," using which it can use a computer to deduce the number of times the homomorphic evaluation circuit was evaluated in total by the aggregator.

FIG. 1 is an exemplary computing environment for use with privacy-preserving HE, according to various embodiments. Specifically, computing environment 100 can include a computer network 110, an aggregator 114, a decryptor 116, and one or more users (or participants, parties, organizations, computing devices, etc.) 1-N designated at 112. Aggregator 114, decryptor 116, and users 112 can include computing devices (or groups or networks thereof) operatively coupled to the computer network 110, such as a server computer, a desktop, a laptop, a portable computing device, and/or a wireless sensor or transceiver. As used herein, a user can be used interchangeably with a party, organization, or any other entity involved with the encryption, management, storage, transmission, or other involvement with data. Also as used herein, parties can more generally optionally include computer-based aggregators and/or decryptors, and users can more specifically represent only parties that provide data for encryption, and other than any aggregators and/or decryptors. It is understood that all embodiments herein can relate to operations at one or more users or one or more parties as appropriate.

Computer network 110 can include a wired connection, network, a wireless network, or any combination(s) thereof. Various levels of trust can exist between the various entities, including the users 112, the aggregator 114, and the decryptor 116. In particular, the decryptor 116 and aggregator 114 may not trust each other. In various embodiments there is a single decryptor 116 and a single aggregator 114, although it is understood that each of the decryptor 116 and aggregator 114 can be instead replaced by multiple sub-entities (e.g., computer processors or systems) that together form one or more of the aggregator 114 and/or decryptor 116 as used herein.

During operation, computing system 100 undergoes various operations, such as but not limited to, encryption of data, decryption of data, aggregation of data, and the performance of privacy-preserving homomorphic operations, such as HE operations.

The description below provides for privacy-preserving HE and a variety of exemplary applications for the improved aggregation and decryption system associated with computing environment 100. In each exemplary application, the discrete treatment of the aggregator 114, the decryptor 116, and the users 112, allows the users 112 to contribute their individual data to an aggregator 114 without having to reveal their individual data values to the data aggregator 114. Preferably, non-colluding, computer-based parties host the decryptor 116 and aggregator 114. In preferable embodiments, the decryptor 116 verifies that the aggregator 114 has done its job properly and honestly, e.g., without intercepting or falsifying inputs or computer-based data. Furthermore, even an aggregator 114 and a decryptor 116 that do not mutually trust each other can operate without significant security or privacy drawbacks.

A user 112 preferably provides a plaintext, which the user or other computer-based entity encrypts for transmission. The encrypted plaintext is referred to herein as a ciphertext. The user 112 can transmit the ciphertext to the aggregator 114 and eventually the decryptor 116 after encryption. Preferably, the decryptor 116 can receive, store, or otherwise has access to a private key. The parties/users can collaborate to generate the public/private key pair, and then share the private key with the decryptor 116. The decryptor 116 uses the private key, which the decryptor does not make available to the aggregator 114, to decrypt the aggregated ciphertext. Optionally, the decryptor 116 uses the private key to decrypt the aggregated ciphertext which has undergone various operations while encrypted remaining encrypted. The decryptor 116 can also authenticate or verify the encrypted, aggregated ciphertext upon receiving it from the aggregator 114. Preferably, when the aggregator 114 performs the HE operations, one or more computers combine the users' 112 pseudonyms into the encrypted ciphertext itself. Once decrypted and authenticated by the decryptor 116 using the private key, the decryptor 116 preferably then sends the clear aggregated result back to the aggregator 114. If the decryptor 116 fails to authenticate the aggregated ciphertext, the aggregator 114 does not send the decrypted plaintext corresponding to the aggregated ciphertext. If permitted by the decryptor 116, the aggregator 114 then can distribute the decrypted data using the computer network 110, and according to various computing schemes.

Disclosed embodiments offer numerous benefits over the existing FHE solutions. This disclosure provides privacy-enhanced FHE schemes, providing updatable and pseudorandom pseudonyms. In preferable embodiments, various entities in the computing environment employ set-systems with restricted intersections described in Grolmusz to generate pseudonyms for the evaluator parties in the presently disclosed FHE schemes. Previously existing schemes lacked the privacy enhanced features described herein. According to the present disclosure, a computer-based decryptor 116 can evaluate or determine a total number of evaluations of an encrypted ciphertext performed at the aggregator 114, and a computer can assign each user 112 a pseudorandom pseudonym to improve privacy for each user. This disclosure also enables an authorized party (e.g., the decryptor 116) to deduce the circuit evaluations' count without incurring considerable overhead, only requiring a computer to perform n+1 matrix multiplications, (whose dimension depends on the underlying lattice) where n is the number of parties. Disclosed embodiments also improve over the prior art by working on top of existing and trusted FHE schemes such as those described by Gentry-1.

Disclosed schemes can be referred to as "leveled" FHE schemes, which can be readily transformed into totally FHE schemes by adopting the bootstrapping theorem provided in detail by Gentry-2. Further, an assumption of "circular security" can be made. On high-level, leveled-FHE can be defined as a relaxed version of total or "pure" FHE. The difference is that in leveled-FHE, the parameters depend on the depth of the arithmetic circuits, instead of the size. Therefore, disclosed FHE schemes build on top of leveled, FHE schemes discussed in Gentry-1. Similar to FHE schemes described in Gentry-1, the present disclosure requires no evaluation key. The evaluators can perform homomorphic operations without knowing the primary user's public key, except for some basic parameters.

Various embodiments of the present disclosure utilize the concepts and principles of "Learning with Errors" concept described in Regev, which operates to provide computer-based systems with improved quantum-computing resistance to the well-established and well-understood principles of the Rivest-Shamir-Adleman (RSA) public key infrastructure (PKI) public/private key encryption scheme. The improved Learning with Errors scheme of Regev is difficult to solve, and provides for discrete and finite lattices that are generated with bits that are challenging for quantum computing to decipher and therefore decrypt. This further improves the privacy and security aspects of the disclosed embodiments.

In an FHE scheme, a message space can be defined as a ring over which a computer evaluates arithmetic circuits (including, e.g., addition and/or multiplication gates) homomorphically. Multiplicative HE is more complex than additive HE. Both multiplicative and additive forms of HE are examples of "partially" HE (PHE) algorithms. Additive HE is commonly used due to its ease of implementation. Finally, according to disclosed FHE schemes, the various multiplication gates of the circuit are evaluated first, followed by the addition gates according to a separate protocol. In other embodiments, a computer in a single computation can evaluate all multiplication and addition gates of the various FHE schemes.

Implementing privacy-preserving HE in computing environment 100, such as where the users 112 can assume updatable pseudorandom pseudonyms or identities, is therefore beneficial to privacy and security in various HE schemes. Introducing user 112 pseudonymity to HE typically has the challenge that the pseudonyms can be predictable, and hence insufficient for achieving significant security and/or privacy. By introducing updatable and pseudorandom pseudonyms to FHE, embodiments of the present disclosure make significant improvements to computers, computing environment 100, and existing HE schemes.

Figure 2:
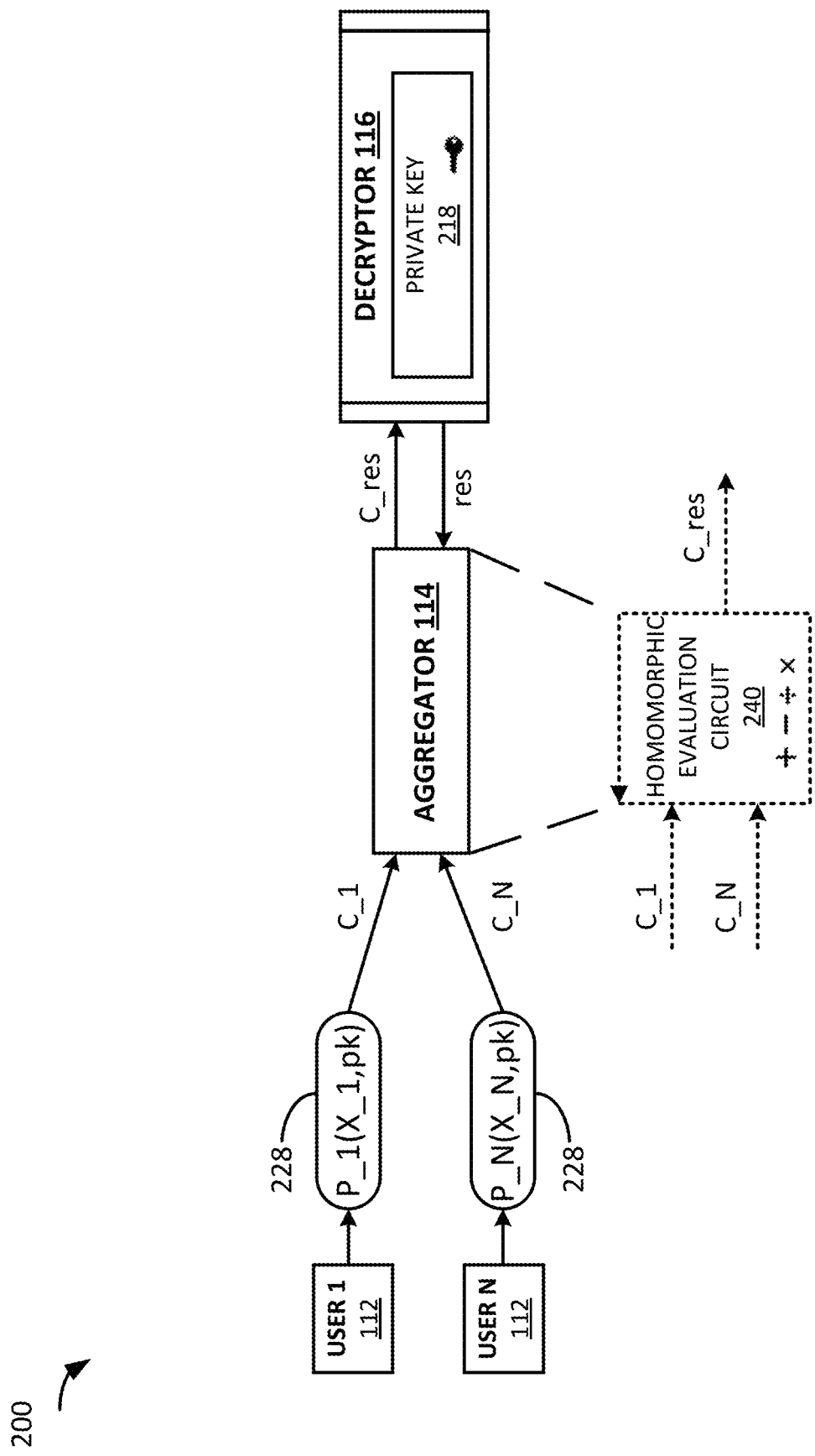
FIG. 2 is a homomorphic encryption system, according to various embodiments.

FIG. 2 is a homomorphic encryption system 200, according to various embodiments. System 200 can be implemented according to the computing environment 100 of FIG. 1.

According to the system 200, a computing entity of system 200 (e.g., the decryptor 116 or aggregator 114) provides the users 112 (or parties) with a unique and updatable pseudonym ($P\_1$, $P\_N$, etc.) and a shared, identical secret group identifier (a private or public key, pk). During an initial setup operation, the users 112 can encrypt plaintexts (or other non-encrypted data or sets thereof) via functions $[P\_1(X\_1,pk)]$ and $[P\_N(X\_N,pk)]$ at 228 and transmit ciphertexts ($C\_1$, $C\_N$, etc.) to the aggregator 114. $P\_1$ and $P\_N$ represent pseudorandom pseudonyms of parties desiring to encrypt plaintexts $X\_1$ and $X\_N$ using shared (optionally) public key (pk). Aggregator 114 can perform various HE operations on the encrypted ciphertexts ($C\_1$, $C\_N$, etc.). The aggregator 114 can transmit the encrypted, aggregated ciphertexts as $C\_res$ upon which the HE operations were performed to the decryptor 116 in order to allow for a reading of one or more plaintexts derived from the encrypted ciphertexts, and the number or source of the various HE operations can be traced by the decryptor 116 to verify accuracy and trustworthiness of the decrypted ciphertexts. The decryptor 116 has access to and/or stores a private key 218 for use in decrypting the aggregated ciphertexts C_res received from aggregator 114, which can then be transmitted as a validated and decrypted result (res) back to the aggregator 114.

While electronically performing HE evaluations, the aggregator 114 uses their respective pseudonyms (P) of each user 112 in conjunction with the shared common value (pk) to electronically "mark" each evaluation as it occurs. Such markings can be kept in a log stored or accessed by the aggregator 114. The party holding the private key, such as the decryptor 116, can decrypt the final result of the HE evaluations. The party holding the private key 218 can use the same private key 218 to reveal the number of "marks," and which marks were made by each party as represented by a pseudonym discussed herein. Based on the marks and party information, the decryptor 116 can use computer-implemented techniques to deduce the number of times the homomorphic evaluation circuit 240 was evaluated in total. Based on the details of the findings, security risks and/or other information regarding the data can be revealed.

Disclosed schemes are secure under a "semi-honest" setting as the knowledge of sensitive data (individual ciphertexts C, private decryption key 218) is split between decryptor 116 and aggregator 114. For example, where the aggregator 114 is malicious and non-trustworthy, the aggregator 114 may ask the decryptor 116 for an (unauthorized) decryption (e.g., a decryption of an individual ciphertext) in order to learn the clear, decrypted value of a user's 112 input plaintext X. Hence, as disclosed herein it is desirable that the decryptor 116 is enabled to perform circuit verification, i.e., verify that the ciphertext C provided by the aggregator 114 is indeed produced by feeding ciphertexts C to the desired homomorphic evaluation circuit 240, and not generated by performing a single round of encryption algorithm on the aggregated plaintext X data. A particular benefit of embodiments disclosed herein is avoiding a malicious aggregator 114 compromising the security and privacy of encrypted data after the aggregator 114 performs HE operations on the data at the homomorphic evaluation circuit 240.

As described herein, the homomorphic evaluation circuit 240, (e.g., an arithmetic circuit) which can be composed of additive and/or multiplicative functions such as computer-based gates, preferably performs one or more HE aggregation function (e.g., performed at or by the aggregator 114) as disclosed herein. According to various embodiments, homomorphic addition and multiplication can be represented and performed by matrix addition and multiplication, respectively.

Verification of the operations performed via evaluation of HE schemes is particularly desirable in settings where multiple distrusting parties and/or users are involved. In the present disclosure, a party holding, or otherwise with access to, a private key (e.g., the decryptor 116) is allowed and/or charged with counting the number of times an arithmetic and/or other homomorphic evaluation circuit 240 has been evaluated via HE disclosed mechanisms. Embodiments of the present disclosure provide for FHE schemes that require the participants to be declared before HE operations are performed, and thus the groups of and/or individual participants are preferably predefined and static.

Figure 3:
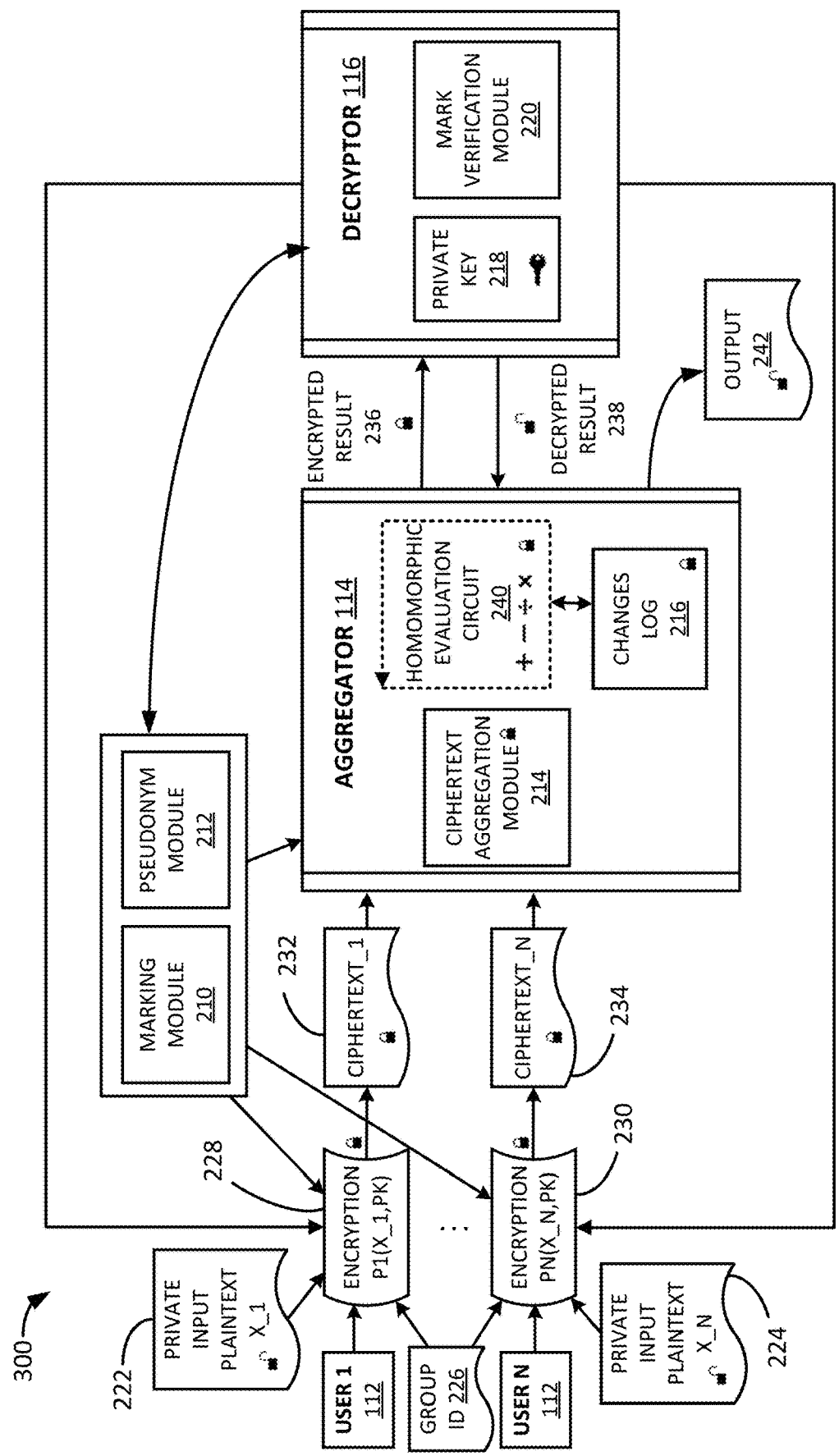
FIG. 3 is a privacy-preserving homomorphic encryption system, according to various embodiments.

FIG. 3 is a privacy-preserving homomorphic encryption system 300, according to various embodiments. System 300 can be similar to system 200 described with reference to FIG. 2, and system 300 can include greater or additional detail and/or features of the operation and components of various embodiments. System 300 can be implemented according to the computing environment 100 of FIG. 1.

According to system 300, any number of users 112 (1-N) provide private input plaintexts X_1, X_N for encryption at 228 for user 1 112 and at 230 for user N 112 at 228 such as private input plaintexts X_1 222 and X_N 224, respectively. The encryptions at 228, 230 yield encrypted ciphertexts C_1, C_N of 232, 234, respectively. The aggregator 114 receives the encrypted ciphertexts 232, 234 and aggregates the encrypted ciphertexts at ciphertext aggregation module 214 hosted by the aggregator 114. The aggregator 114 also hosts a homomorphic evaluation circuit 240 as described above, and a changes log 216 that tracks HE evaluations done by circuit 240 according to each user's 112 pseudonym, plaintext, and homomorphic operation performed. The changes log 216 preferably uses various markings and/or metadata provided by the marking and/or pseudonym modules 210, 212. The aggregator 114 can also communicate with marking 210 and/or pseudonym modules 212. The marking module 210 operates to assist the changes log 216 of the aggregator 114 to provide a log of operations tracking operations and details thereof at the changes log 216.

As discussed with reference to FIG. 2, the decryptor 116 is an entity that can receive an aggregated, encrypted result 236 from the aggregator 114 and can output a decrypted result 238 back to the aggregator 114 while accessing a private key 218, provided that the decryptor 116 successfully authenticates the aggregated ciphertext(s) received from the aggregator 114. The decryptor 116 can communicate with various marking 210 and/or pseudonym modules 212.

In order to electronically authenticate encrypted, aggregated ciphertexts received from the aggregator 114, the decryptor 116 also preferably hosts a computer-based a mark verification module 220. The mark verification module 220 preferably operates in conjunction with the marking and/or pseudonym modules 210, 212 to verify the veracity and/or authenticity of the encrypted result 236 prior to outputting the decrypted result at 238. Once authenticated by the decryptor 116, the decrypted result 238 can be returned to the aggregator 114, which can then distribute the output 242 decrypted plaintexts or other decrypted data to any appropriate party or user. If the decryptor 116 determines that the aggregated ciphertext(s) received from the aggregator 114 are then authentic, then the decryptor 116 does not provide decrypted data such as the individual aggregated plaintexts to the aggregator 114.

Figure 4:
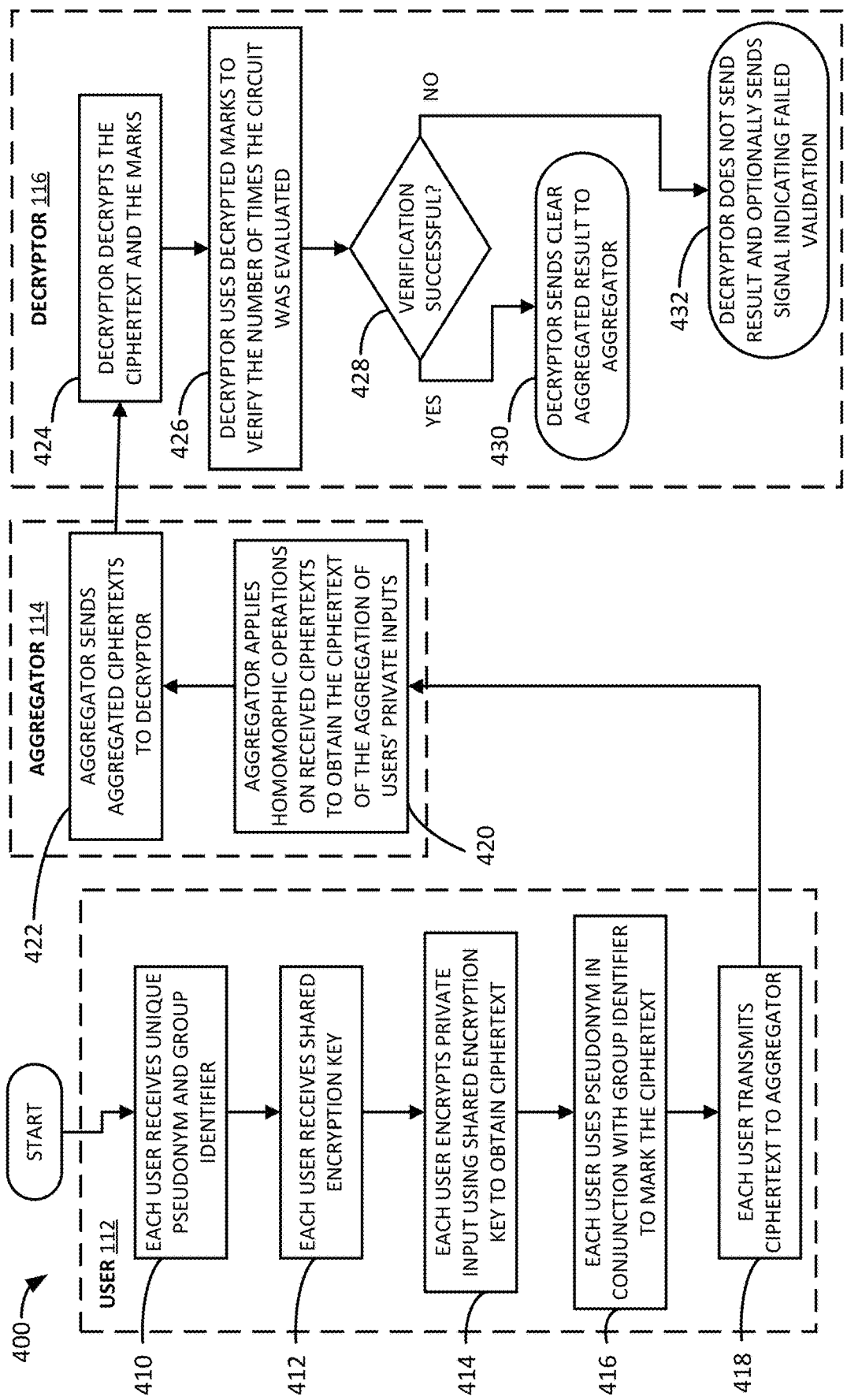
FIG. 4 is a process for privacy-preserving homomorphic encryption, according to various embodiments.

FIG. 4 is a process 400 for privacy-preserving homomorphic encryption, according to various embodiments.

Process 400 can be a computer-based process that is implemented by at least one computer or entity in the computing environment 100 as disclosed in FIG. 1. Process 400 can start and can proceed to operations 410-418, which are performed at or related to user 112 as described herein. According to operation 410, each user receives a unique pseudonym and group identifier. At operation 412, each user 112 receives a shared encryption key. The shared encryption key can be received from a decryptor 116 as used herein, and can be public or private according to various embodiments. In various embodiments, the group identifier enables parties to verify that only authorized parties participated in a protocol or operation. Preferably, a trusted entity generates the shared encryption key during a setup phase, and the trusted entity shares the shared encryption key with all parties in the group. The trusted entity can be a computing entity, such as the decryptor 116. Next, at operation 414, each user encrypts a private input or plaintext using the shared encryption key to obtain an encrypted ciphertext. Next, at operation 416, each user uses a pseudonym in conjunction with the group identifier to mark the encrypted ciphertext. Following operation 416, at operation 418 each user transmits his or her ciphertext to an aggregator 114.

At operation 420, the aggregator 114 applies one or more homomorphic operations on or to the received ciphertexts to obtain the ciphertext of the aggregation of the users' private inputs. Following one or more operation 420, at operation 422 the aggregator 114 sends the aggregated ciphertexts to a decryptor 116.

At operation 424, the decryptor 116 receives and decrypts the aggregated ciphertexts and the corresponding marks associated with the homomorphic operations performed at the aggregator 114 at operation 420. Next, at operation 426, the decryptor 116 uses the decrypted marks to authenticate the received aggregated ciphertexts by verifying the number of times the homomorphic evaluation circuit (e.g., arithmetic circuit) was evaluated at operation 420. Following operation 420, it the decryptor 116 can determine whether the verification at operation 426 was successful or not. If the verification was successful, the decryptor 116 sends the decrypted, clear aggregated result back to the aggregator 114 at operation 430. If at operation 428 the decryptor 116 instead determines that the verification was not successful, the decryptor 116 does not send any result to the aggregator 114, and optionally send signal to one or more entities that the validation attempt was unsuccessful. The process can then end, repeat, or partially repeat, according to various embodiments.

Figure 5:
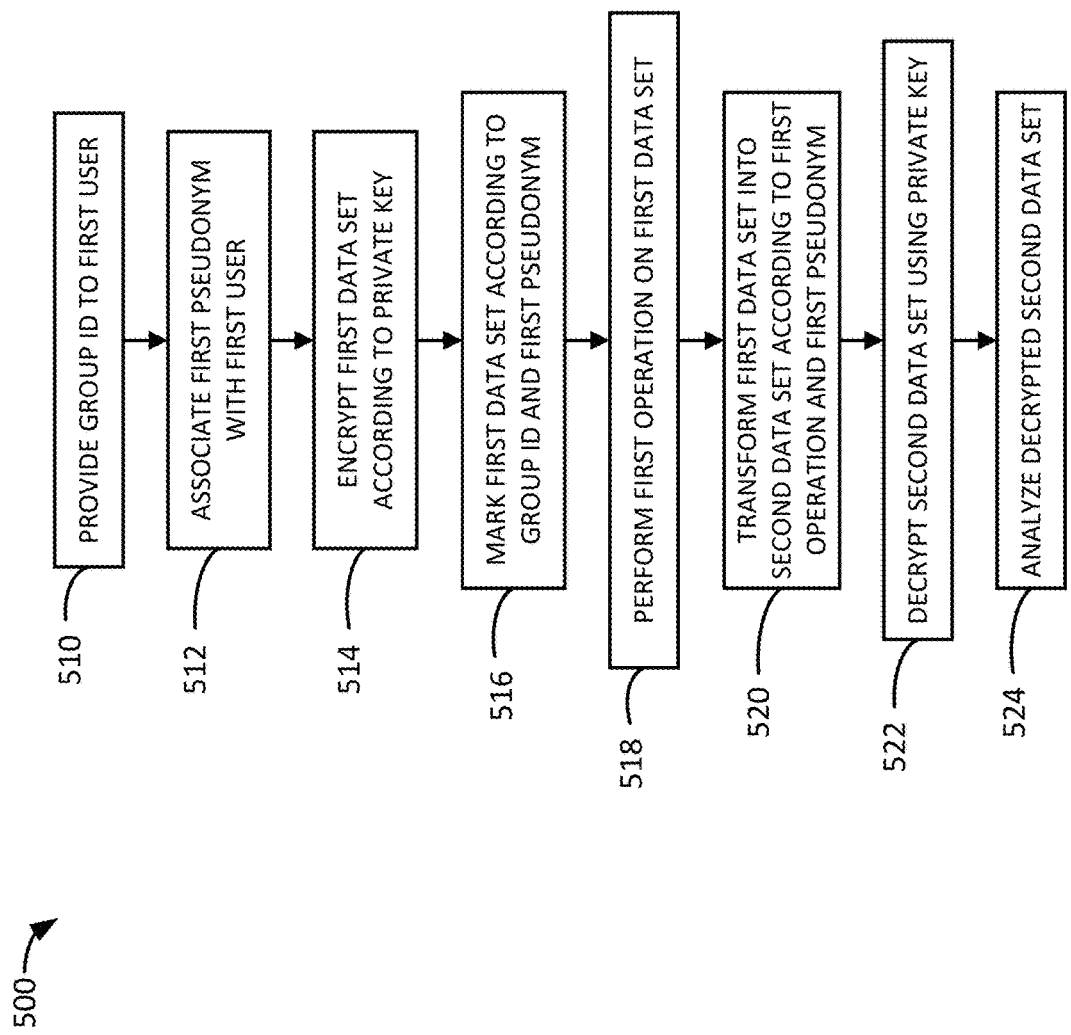
FIG. 5 is another process for privacy-preserving homomorphic encryption, according to various embodiments.

FIG. 5 is another process 500 for privacy-preserving homomorphic encryption, according to various embodiments.

Process 500 is a computer-based method of improving data security or privacy that is implemented in the computing environment 100 as disclosed in FIG. 1. Process 500 can begin at operation 510 by providing a group identifier value to at least a first user of one or more users. Following operation 510, at operation 512, a computer-based pseudo-random pseudonym generator (e.g., pseudonym module 212 of FIG. 3) generates a first pseudonym and associates the first pseudorandom pseudonym with the first user. The first pseudonym can be an automatically, computer-generated, unique pseudorandom pseudonym. Next, at operation 514, a first data set can be encrypted according to a private key. In some embodiments, prior to encryption the first data set is a plaintext. The first data set can be associated with the first user. Following operation 514, at operation 516, the encrypted first data set can be marked according to the group identifier and the first pseudonym. Next, at operation 518 a first operation can be performed on the encrypted first data set. The first operation can be an arithmetic operation. The first operation can be a homomorphic operation that is either additive/subtractive or multiplicative/divisive. Following operation 518, at operation 520 can include transforming the encrypted first data set into an encrypted second data set according to the first operation performed and the first pseudonym. 7. The encrypted second data set is preferably a homomorphic encrypted data set, and optionally a fully homomorphic encrypted data set. Next, at operation 522, the encrypted second data set can be decrypted using the private key. Finally, at operation 524, the decrypted second data set can be analyzed and the process 500 may end.

The analyzing the decrypted second data set optionally includes using one or more computer to verify the decrypted second data set at least by determining how many operations were performed on the encrypted second data set. In further optional embodiments, the verifying further comprises determining which operations were performed by which pseudonym for the second encrypted data set. According to various embodiments, the decrypting the encrypted second data set using the private key and the analyzing the decrypted second data set are performed by a decryptor (e.g., decryptor 116). According to certain embodiments, the analyzing further comprises verifying one or more gates of an encryption circuit, and optionally verifying a multiplication gate before verifying an addition gate. The verifying the one or more gates can be performed by a computer in the computing environment 100 as a single computation.

In yet further embodiments, the process 500 further includes providing the group identifier value to a second user of the one or more users. Also optionally, a second pseudonym can be associated with the second user. Still optionally, a third data set can be encrypted according to the private key. Still according to optional embodiments, the encrypted third data set can be marked according to the group identifier and the second pseudonym. An aggregator 114, as described herein, can receive and aggregate the encrypted first data set and the encrypted third data set into an encrypted aggregated fourth data set. A decryptor 116, as described herein, can receive the aggregated fourth data set and use the private key to decrypt the received encrypted aggregated fourth data set. According to some embodiments, the decryptor 116 transmits the decrypted fourth aggregated data set to the aggregator after the decryptor 116 decrypts the encrypted fourth aggregated data set using the private key. The encrypted aggregated fourth data set can be a ciphertext, and the decrypted aggregated fourth data set can be a plaintext.

According to yet further embodiments, the performing the first operation on the encrypted first data set and the marking the encrypted first data set according to the first operation and the first pseudonym are performed by the aggregator 114. Following the transforming the encrypted first data set into an encrypted second data set according to the first operation performed and the first pseudonym, the first pseudonym is preferably updated and remains associated with the first user. Optionally, the aggregator 114 through changes log 216 provides and updates a log dynamically, and tracks each pseudonym and each operation performed while data is encrypted such that after the decryption. Each operation performed on the encrypted second data set is associated with a user.

Figure 6:
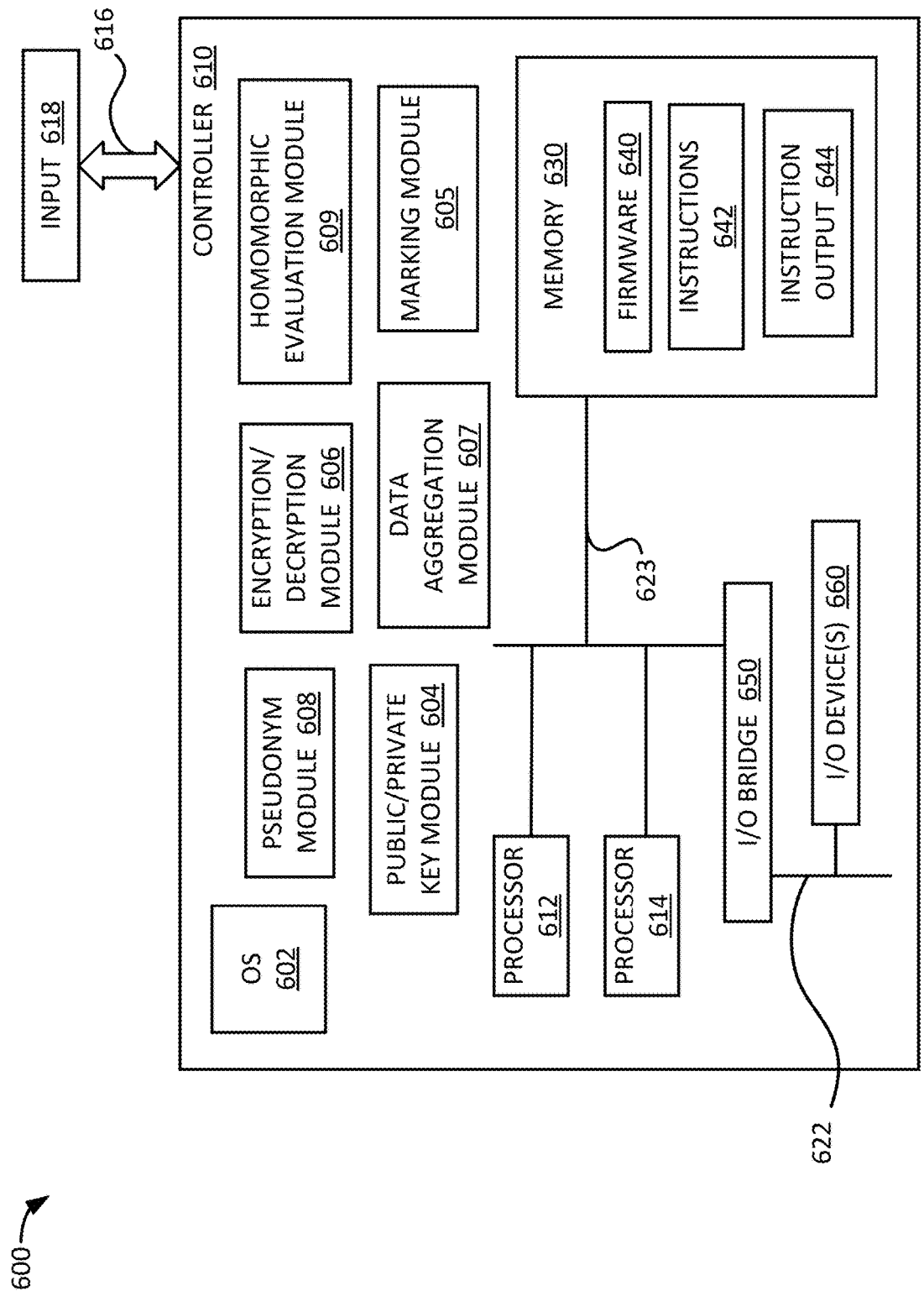
FIG. 6 is a block schematic diagram of a computer system according to embodiments of the present disclosure.

FIG. 6 is a block schematic diagram of a computer system 600 according to embodiments of the present disclosure. The computer system 600 can be implemented according to the computing environment 100 of FIG. 1.

Computer system 600, as shown, is configured with an interface 616 to enable controller 610 to receive a request to provide privacy-preserving HE, as described in particular with regard to FIGS. 1-5. An input 618 may be received at interface 616. In embodiments, the interface 616 can enable controller 610 to receive, or otherwise access, the input 618 via, for example, a network (e.g., an intranet, or a public network such as the Internet), or a storage medium, such as a disk drive internal or connected to controller 610. The interface can be configured for human input or other input devices, such as described later in regard to components of controller 610. It would be apparent to one of skill in the art that the interface can be any of a variety of interface types or mechanisms suitable for a computer, or a program operating in a computer, to receive or otherwise access or receive a source input or file.

Processors 612, 614 included in controller 610 are connected by a memory interface 620 to memory device or module 630. In embodiments, the memory 630 can be a cache memory, a main memory, a flash memory, or a combination of these or other varieties of electronic devices capable of storing information and, optionally, making the information, or locations storing the information within the memory 630, accessible to a processor. Memory 630 can be formed of a single electronic (or, in some embodiments, other technologies such as optical) module or can be formed of a plurality of memory devices. Memory 630, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 600 can include a plurality of memory devices. A memory interface, such as 620, between one or more processors and one or more memory devices can be, for example, a memory bus common to one or more processors and one or more memory devices. In some embodiments, a memory interface, such as 623, between a processor (e.g., 612, 614) and a memory 630 can be point to point connection between the processor and the memory, and each processor in the computer 600 can have a point-to-point connection to each of one or more of the memory devices. In other embodiments, a processor (for example, 612) can be connected to a memory (e.g., memory 630) by means of a connection (not shown) to another processor (e.g., 614) connected to the memory (e.g., 623 from processor 614 to memory 630).

Computer 600 can include an input/output (I/O) bridge 650, which can be connected to a memory interface 620, or to processors 612, 614. An I/O bridge 650 can interface the processors 612, 614 and/or memory devices 630 of the computer 600 (or, other I/O devices) to I/O devices 660 connected to the bridge 650. For example, controller 610 includes I/O bridge 650 interfacing memory interface 623 to I/O devices, such as I/O device 660. In some embodiments, an I/O bridge can connect directly to a processor or a memory, or can be a component included in a processor or a memory. An I/O bridge 650 can be, for example, a peripheral component interconnect express (PCI-Express) or other I/O bus bridge, or can be an I/O adapter.

The I/O bridge 650 can connect to I/O devices 660 by means of an I/O interface, or I/O bus, such as I/O bus 622 of controller 610. For example, I/O bus 622 can be a PCI-Express or other I/O bus. I/O devices 660 can be any of a variety of peripheral I/O devices or I/O adapters connecting to peripheral I/O devices. For example, I/O device 660 can be a graphics card, keyboard or other input device, a hard disk drive (HDD), solid-state drive (SSD) or other storage device, a network interface card (NIC), etc. I/O devices 660 can include an I/O adapter, such as a PCI-Express adapter, that connects components (e.g., processors or memory devices) of the computer 600 to various I/O devices 660 (e.g., disk drives, Ethernet networks, video displays, keyboards, mice, styli, touchscreens, etc.).

Computer 600 can include instructions executable by one or more of the processors 612, 614 (or, processing elements, such as threads of a processor). The instructions can be a component of one or more programs. The programs, or the instructions, can be stored in, and/or utilize, one or more memory devices of computer 600. As illustrated in the example of FIG. 6, controller 610 includes a plurality of programs or modules, such as public/private key module 604, marking module 605, encryption/decryption module 606 (which can include authentication functionality), data aggregation module 607, pseudonym module 608, and homomorphic evaluation module 609. A program can be, for example, an application program, an operating system (OS) or a function of an OS, or a utility or built-in function of the computer 600. A program can be a hypervisor, and the hypervisor can, for example, manage sharing resources of the computer 600 (e.g., a processor or regions of a memory, or access to an I/O device) among a plurality of programs or OSes.

Programs can be "stand-alone" programs that execute on processors and use memory within the computer 600 directly, without requiring another program to control their execution or their use of resources of the computer 600. For example, controller 610 includes (optionally) stand-alone programs in public/private key module 604, marking module 605, encryption/decryption module 606, data aggregation module 607, pseudonym module 608, and homomorphic evaluation module 609. A stand-alone program can perform particular functions within the computer 600, such as controlling, or interfacing (e.g., access by other programs) an I/O interface or I/O device. A stand-alone program can, for example, manage the operation, or access to, a memory (e.g., memory 630). A basic I/O subsystem (BIOS), or a computer boot program (e.g., a program that can load and initiate execution of other programs) can be a standalone program.

Controller 610 within computer 600 can include one or more OS 602, and an OS 602 can control the execution of other programs such as, for example, to start or stop a program, or to manage resources of the computer 600 used by a program. For example, controller 610 includes OS 602, which can include, or manage execution of, one or more programs, such as OS 602 including (or, managing) public/private key module 604, marking module 605, encryption/decryption module 606, data aggregation module 607, pseudonym module 608, and homomorphic evaluation module 609. In some embodiments, an OS 602 can function as a hypervisor.

A program can be embodied as firmware (e.g., BIOS in a desktop computer, or a hypervisor) and the firmware can execute on one or more processors and, optionally, can use memory, included in the computer 600. Firmware can be stored in a memory (e.g., a flash memory) of the computer 600. For example, controller 610 includes firmware 640 stored in memory 630. In other embodiments, firmware can be embodied as instructions (e.g., comprising a computer program product) on a storage medium (e.g., a CD-ROM, DVD-ROM, flash memory, or disk drive), and the computer 600 can access the instructions from the storage medium.

In embodiments of the present disclosure, computer 600 can include instructions for data management and protection. Controller 610 includes, for example, public/private key module 604, marking module 605, encryption/decryption module 606, data aggregation module 607, pseudonym module 608, and homomorphic evaluation module 609, which can operate to provide privacy-preserving homomorphic encryption according to various embodiments herein.

The example computer system 600 and controller 610 are not intended to limiting to embodiments. In embodiments, computer system 600 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, controller 610 can be, for example, a computing device having a processor (e.g., 612) capable of executing computing instructions and, optionally, a memory 630 in communication with the processor. For example, controller 610 can be a desktop or laptop computer; a tablet computer, mobile computing device, personal digital assistant (PDA), or cellular phone; or, a server computer, a high-performance computer (HPC), or a super computer. Controller 610 can be, for example, a computing device incorporated into a wearable apparatus (e.g., an article of clothing, a wristwatch, or eyeglasses), an appliance (e.g., a refrigerator, or a lighting control), a mechanical device, or, e.g., a motorized vehicle. It would be apparent to one skilled in the art that a computer embodying aspects and features of the disclosure can be any of a variety of computing devices having processors and, optionally, memory devices, and/or programs.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of improving data security or privacy in a computing environment, comprising:
   providing a group identifier value to at least a first user of one or more users;
   associating a first pseudonym with the first user;
   encrypting a first data set according to a private key;
   marking the encrypted first data set according to the group identifier value and the first pseudonym;
   performing a first homomorphic operation on the encrypted first data set;
   transforming the encrypted first data set into an encrypted second data set according to the first homomorphic operation performed and the first pseudonym;
   decrypting the encrypted second data set using the private key; and
   analyzing the decrypted second data set.

2. The method of claim 1, wherein the first data set is associated with the first user.

3. The method of claim 1, wherein the first pseudonym is an automatically-generated, unique pseudorandom pseudonym.

4. The method of claim 1, wherein the encrypted second data set is a homomorphic encrypted data set.

5. The method of claim 1, wherein the analyzing the decrypted second data set includes verifying the decrypted second data set at least by determining how many operations were performed on the encrypted second data set.

6. The method of claim 5, wherein the verifying further comprises determining which operations were performed by which pseudonym for the second encrypted data set.

7. The method of claim 1, wherein the decrypting the encrypted second data set using the private key and the analyzing the decrypted second data set are performed by a decryptor.

8. The method of claim 1, wherein the analyzing comprises verifying one or more gates of an encryption circuit.

9. The method of claim 1, further comprising:
   providing the group identifier value to a second user of the one or more users;
   associating a second pseudonym with the second user;
   encrypting a third data set according to the private key; and
   marking the encrypted third data set according to the group identifier value and the second pseudonym.

10. The method of claim 1, wherein the performing the first homomorphic operation on the encrypted first data set and the marking the encrypted first data set according to the first homomorphic operation and the first pseudonym are performed by an aggregator.

11. The method of claim 1, wherein following the transforming the encrypted first data set into an encrypted second data set according to the first homomorphic operation performed and the first pseudonym, the first pseudonym is updated and remains associated with the first user.

12. The method of claim 1, further comprising providing a log that is updated dynamically and tracks each pseudonym and each operation performed while data is encrypted such that after the decryption, each operation performed on the encrypted second data set is associated with a user.

13. A system, comprising:
   a hardware processor operatively coupled to a memory;
   the hardware processor configured to execute instructions stored on the memory, including instructions for a process for improving data security or privacy in a computing environment, the process comprising:
      providing a group identifier value to at least a first user of one or more users;
      associating a first pseudonym with the first user;
      encrypting a first data set according to a private key;
      marking the encrypted first data set according to the group identifier value and the first pseudonym;
      performing a first homomorphic operation on the encrypted first data set;
      transforming the encrypted first data set into an encrypted second data set according to the first homomorphic operation performed and the first pseudonym;
      decrypting the encrypted second data set using the private key; and
      analyzing the decrypted second data set.

14. The system of claim 13, wherein the analyzing the decrypted second data set includes verifying the decrypted second data set at least by determining how many operations were performed on the encrypted second data set.

15. The system of claim 14, wherein the verifying further comprises determining which operations were performed by which pseudonym for the second encrypted data set.

16. The system of claim 13, wherein the decrypting the encrypted second data set using the private key and the analyzing the decrypted second data set are performed by a decryptor.

17. A computer program product for improving data security or privacy, the computer program product comprising a non-transitory computer-readable storage medium having program code embodied therewith, the program code comprising computer-readable program code configured to cause a processor to perform the steps of:
   providing a group identifier value to at least a first user of one or more users;
   associating a first pseudonym with the first user;
   encrypting a first data set according to a private key;

marking the encrypted first data set according to the group identifier value and the first pseudonym;

performing a first homomorphic operation on the encrypted first data set;

transforming the encrypted first data set into an encrypted second data set according to the first homomorphic operation performed and the first pseudonym;

decrypting the encrypted second data set using the private key; and analyzing the decrypted second data set.

18. The computer program product of claim 17, wherein the analyzing the decrypted second data set includes verifying the decrypted second data set at least by determining how many operations were performed on the encrypted second data set, and wherein the verifying further comprises determining which operations were performed by which pseudonym for the second encrypted data set.

19. The computer program product of claim 17, wherein the decrypting the encrypted second data set using the private key and the analyzing the decrypted second data set are performed by a decryptor.

\* \* \* \* \*